United States Patent
Bai et al.

(10) Patent No.: US 7,283,674 B2
(45) Date of Patent: Oct. 16, 2007

(54) USING GRAPHIC OBJECTS IN MFD SCAN-TO-EXPORT FUNCTION

(75) Inventors: Yingjun Bai, Webster, NY (US); Zhigang Fan, Webster, NY (US); Timothy W. Jacobs, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 700 days.

(21) Appl. No.: 10/877,302

(22) Filed: Jun. 25, 2004

(65) Prior Publication Data

US 2005/0286776 A1   Dec. 29, 2005

(51) Int. Cl.
G06K 9/36 (2006.01)
G06K 9/00 (2006.01)

(52) U.S. Cl. .................................. 382/232

(58) Field of Classification Search ........... 382/162, 382/164, 165, 166, 173, 181, 199, 203, 232, 382/254, 305; 358/426.01
See application file for complete search history.

(56) References Cited

U.S. PATENT DOCUMENTS

| | | | |
|---|---|---|---|
| 6,324,305 B1 | 11/2001 | Holladay et al. | |
| 6,373,981 B1 | 4/2002 | de Queiroz et al. | |
| 6,400,844 B1 | 6/2002 | Fan et al. | |
| 6,608,928 B1 * | 8/2003 | Queiroz | 382/173 |
| 6,701,012 B1 * | 3/2004 | Matthews | 382/173 |
| 7,184,596 B2 * | 2/2007 | Sekino et al. | 382/232 |
| 7,190,837 B2 * | 3/2007 | Li et al. | 382/232 |
| 7,236,641 B2 * | 6/2007 | Curry et al. | 382/254 |
| 2005/0286776 A1 * | 12/2005 | Bai et al. | 382/232 |
| 2006/0133690 A1 * | 6/2006 | Bloomberg et al. | 382/269 |

* cited by examiner

*Primary Examiner*—Amir Alavi
(74) *Attorney, Agent, or Firm*—Fay Sharpe LLP

(57) ABSTRACT

A method of compressing a document includes: acquiring an image of the document, the image represented by pixels; segmenting the image into Mixed Raster Content (MRC) planes including a foreground plane (12) that receives a first portion of the pixels, a background plane (14) that receives a second portion of the pixels, and a selector plane (16) that identifies which of the foreground and background planes the pixels belong to; identifying a geometric shape in at least one of the MRC planes; determining if the identified geometric shape has a substantially uniform color; and, replacing the identified shape when it is determined to have a substantially uniform color with a vector graphic representation of the geometric shape.

16 Claims, 3 Drawing Sheets

USING GRAPHIC OBJECTS IN MFD SCAN-TO-EXPORT FUNCTION

BACKGROUND

The present inventive subject matter relates to the imaging arts. It finds particular application in conjunction with so-called Multi-Function Devices MFDs, and will be described with particular reference thereto. However, one of ordinary skill in the art will appreciate that it is also amenable to other like applications, e.g., copiers, printers, fax machines, scanners, etc.

In general, an MFD operates as a plurality of different imaging devices, e.g., as a printer, copier, fax machine, and/or scanner. Currently, MFDs often use what is known as a Mixed Raster Content (MRC) model within a file container (usually a Portable Document Format (PDF)), for example, for scan-to-export functions such as faxing or scanning a document into an electronic image file.

The MRC representation of documents is generally versatile. The MRC representation enables the use of multiple "planes" or "layers" for the purpose of representing the content of documents. In fact, the MRC representation is becoming increasingly important in the marketplace. For example, it is well established as a main color-fax standard.

In an MRC representation, an image is represented by more than one image planes or layers. One advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded in one of the planes. Following a careful separation, the various planes can be independently compressed using standard compression schemes with good compression and high quality at the same time.

The MRC representation generally comprises up to four independent planes: a foreground plane, a background plane, a selector plane, and an optional rendering hints plane. In the most general case, there is optionally multiple foreground and selector pairs at higher levels. However, in most applications, the representation is limited to three or four planes. The background plane is typically used for storing continuous-tone information such as pictures and/or smoothly varying background colors. The selector plane normally holds the image of text (binary) as well as other edge information (e.g., line art drawings). The foreground plane usually holds the color of the corresponding text and/or line art. However, the MRC representation only specifies the planes and their associated compression methods. It does not otherwise restrict nor enforce the content of each of the planes. The content of each of the planes may be defined appropriately by an implementation of the MRC representation.

The MRC structure also allows for a fourth plane, the rendering hints plane, which is used for communicating additional information about the content of the document. For example, the rendering hints plane may carry the ICC (International Color Consortium) color hints that identify the best color matching strategy for the various objects on the page.

The foreground and background planes are typically defined to be two full-color planes, e.g., (L, a, b) or YCC planes. The selector plane is defined as a binary (e.g., 1-bit deep) plane. The rendering hints plane is typically restricted to an 8-bit plane. One exemplary MRC representation specifies that the foreground and background are to be JPEG (Joint Photographic Experts Group) compressed, and that the selector plane is to be ITU-G4 compressed (standard Group 4 facsimile compression). The rendering hints plane is considered to be optional, but if one is used, a compression scheme similar to the Lempel-Zev-Welch (LZW) scheme may be used for its compression. In general, the foreground, background, selector and rendering hints planes can all be at different resolutions.

The method for assembling back a "segmented" MRC image from its components (i.e., planes) is by "pouring" the foreground colors through the selector plane "mask" on top of the background plane, thus overwriting the previous content of the background plane at these locations. In other words, the assembly is achieved by multiplexing between the foreground and background information on a pixel by pixel basis, based on the binary control signal of the selector plane. For example, if the selector value is 1, the content of foreground is used; otherwise (i.e., for selector value=0) the content of background is used. The multiplexing operation is repeated on a pixel by pixel basis until all of the output pixels have been defined.

While generally MRC approach in general affords an efficient encoding of the raster data, the MRC model still exhibits drawbacks in some respects. For example, it may still be further enhanced to provide yet better compression in certain instances. Accordingly, a new and improved method for compression of MRC representations in an MFD is disclosed that overcomes the aforementioned drawbacks and others.

BRIEF DESCRIPTION

In accordance with one exemplary embodiment, a method of compressing a document is provided. The method includes: acquiring an image of the document, the image represented by pixels; segmenting the image into Mixed Raster Content (MRC) planes including a foreground plane that receives a first portion of the pixels, a background plane that receives a second portion of the pixels, and a selector plane that identifies which of the foreground and background planes the pixels belong to; identifying a geometric shape in at least one of the MRC planes; determining if the identified geometric shape has a substantially uniform color; and, replacing the identified shape when it is determined to have a substantially uniform color with a vector graphic representation of the geometric shape.

In accordance with another exemplary embodiment, a system for compressing a document is also provided. The system includes: means for acquiring an image of the document, the image represented by pixels; means for segmenting the image into Mixed Raster Content (MRC) planes including a foreground plane that receives a first portion of the pixels, a background plane that receives a second portion of the pixels, and a selector plane that identifies which of the foreground and background planes the pixels belong to; means for identifying a geometric shape in at least one of the MRC planes; means for determining if the identified geometric shape has a substantially uniform color; means for replacing the identified shape when it is determined to have a substantially uniform color with a vector graphic representation of the geometric shape; and, means for compressing at least one of the MRC planes.

In accordance with yet another exemplary embodiment, an image processing device includes: a document input module that acquires an input pixel map representation of an input document, the input pixel map containing a plurality of pixels; and, an image processor. The image processor: segments the input pixel map into Mixed Raster Content (MRC) data including a first plane that receives a first portion of the pixels, a second plane that receives a second portion of the pixels, and a selector plane that identifies which of the first and second planes the pixels belong to; identifies a geometric shape in at least one of the planes; determines if the identified geometric shape has a substantially uniform color; replaces the identified shape when it is determined to have a substantially uniform color with a vector graphic representation of the geometric shape; compresses at least one of the planes; and, places the MRC data within a file container.

Numerous advantages and benefits of the inventive subject matter disclosed herein will become apparent to those of ordinary skill in the art upon reading and understanding the present specification.

BRIEF DESCRIPTION OF THE DRAWINGS

The present inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

The present inventive subject matter is directed to a method and apparatus for separately processing the various types of data contained in a composite image or document. While described with reference to an MRC technique, it may be adapted for use with other methods and apparatus' and is not therefore, limited to an MRC format. Further, while described with reference to an MFD, the technique is suitable for use in various devices that store and/or transmit documents such as facsimile devices, image storage devices and the like, and processing of both color and grayscale black and white images are contemplated.

A pixel map is one in which each discrete location on the page contains a picture element or "pixel" that emits a light signal with a value that indicates the color or, in the case of gray scale documents, how light or dark the image is at that location. As those skilled in the art will appreciate, most pixel maps have values that are taken from a set of discrete, non-negative integers.

For example, in a pixel map for a color document, individual separations are often represented as digital values, often in the range 0 to 255, where 0 represents no colorant (i.e., when CMYK separations are used), or the lowest value in the range when luminance-chrominance separations are used, and 255 represents the maximum amount of colorant or the highest value in the range. In a gray-scale pixel map this typically translates to pixel values which range from 0, for black, to 255, for the whitest tone possible. The pixel maps of concern in one embodiment are representations of "scanned" images. That is, images which are created by digitizing light reflected off of physical media using a digital scanner. The term bitmap is used to mean a binary pixel map in which pixels can take one of two values, 1 or 0.

Figure 1:
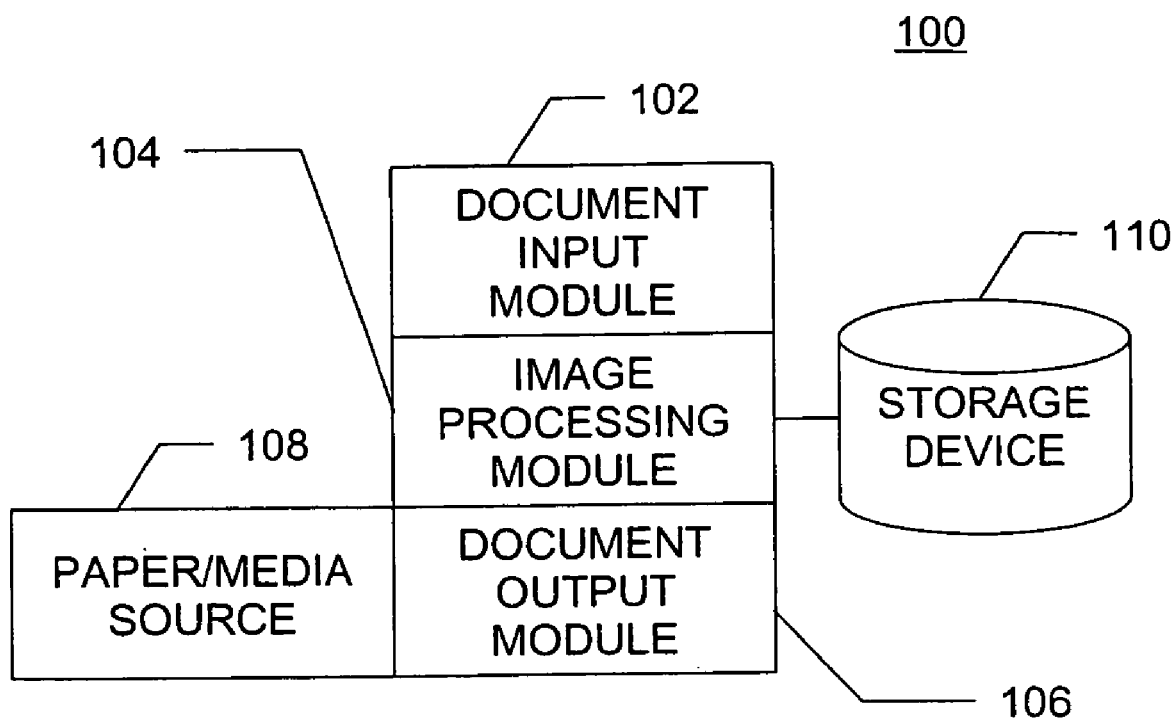
FIG. 1 is a diagrammatic illustration showing an exemplary MFD including an image processing module embodying aspects of the present inventive subject matter.

With reference to FIG. 1, there is illustrated an MFD 100. As illustrated, the MFD 100 includes: an image input and/or acquiring module 102 for input of a document to be processed; an image processing module 104 for processing the input document; and an image output and/or rendering module 106 for outputting and/or rendering the input document. Suitably, the image input module 102 includes a scanner that acquires or captures an input document in the usual manner. Alternately, the input document is acquired from another source such as a networked computer (not shown), or it is acquired as an incoming fax. In any event, the input document is selectively processed by the processing module 104 in accordance with a selected function designated by a user, e.g., entered via a user interface or the networked computer.

Suitably, the output module 106 includes an image rendering device such as, for example, a xerographic print engine, an ink jet print engine, etc. that is used to print documents, reproduce copies of documents and/or print incoming faxes on supplied paper or other media from a paper/media source 108, for example, a paper tray. The output module 106 also optionally includes a facsimile function for sending a fax of the input document to a specified party. Optionally, an input document is stored in a memory or other data storage device 110 of the MFD 100 or on the networked computer, for example, as an electronic file.

Figure 2:
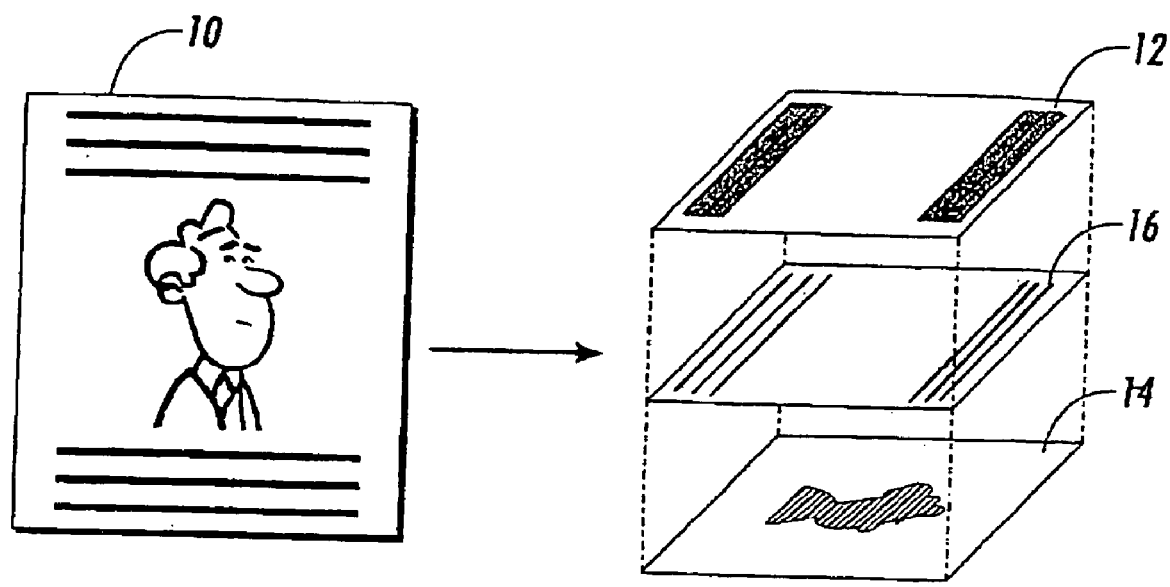
FIG. 2 is a diagrammatic illustration showing an exemplary pixel map being segmented into MRC planes by the MFD of FIG. 1.

Turning now to FIG. 2 for a more detailed description of the MRC format, an exemplary pixel map 10 representing a color or gray-scale input document is preferably decomposed into a three plane page format as indicated. The document format is typically comprised of an upper or foreground plane 12, a lower or background plane 14, and a selector plane 16. Planes 12 and plane 14 contain pixels that describe the original image data, wherein pixels have been separated based upon defined criteria. The selector plane 16 keeps track of every pixel in the original pixel map 10 and maps all pixels to an exact spot on either the foreground plane 12 or the background plane 14. Suitably, the mask of the selector plane 16 carries the high frequency information (e.g., the lines of text both at the top and at the bottom in this case), while the foreground plane 12 contains information describing the colors (e.g., in this case it would be most likely be two boxes of the text color at a corresponding location of the text).

Suitably, the upper and lower planes are stored at the same bit depth and number of colors as the original pixel map 10, but optionally at reduced resolution. Selector plane 16 is created and stored as a bitmap. It is important to recognize that while the terms "upper" and "lower" are used to describe the planes on which data resides, it is not intended to limit the inventive subjection matter to any particular arrangement or configuration.

After processing, optionally all three planes are compressed using a method suitable for the type of data residing thereon. For example, upper plane 12 and lower plane 14 may be compressed and stored using a "lossy" compression technique such as JPEG, while selector plane 16 is compressed and stored using a lossless compression format such as G4 compression. It would be apparent to one of skill in the art to compress and store the planes using other formats that are suitable for the intended use of the output document.

Figure 3:
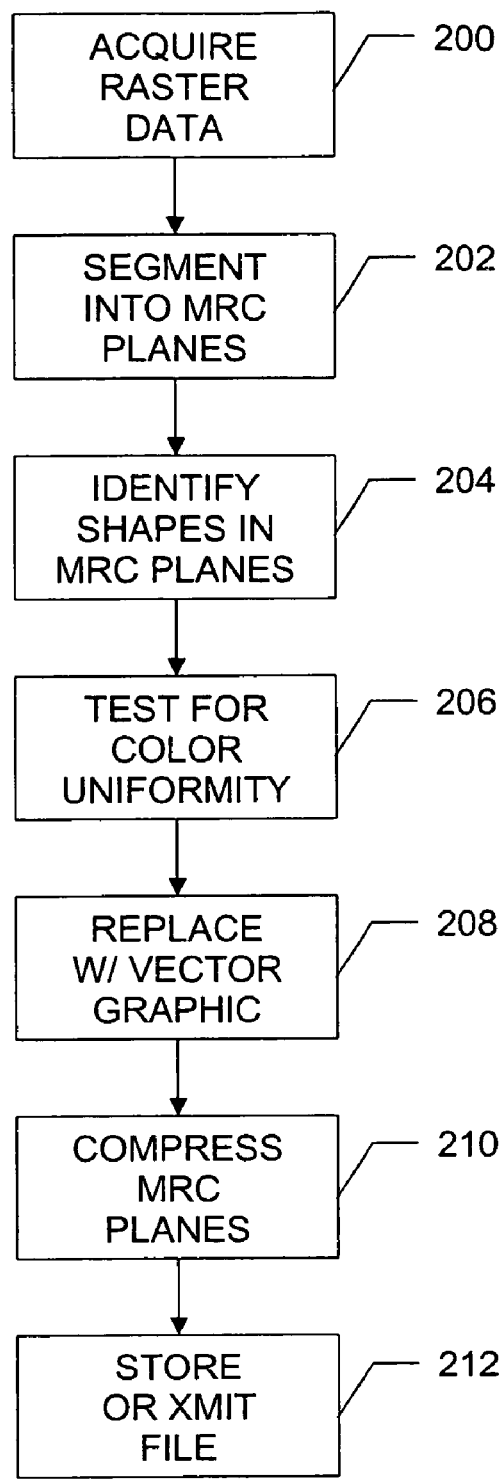
FIG. 3 is a flow chart showing an exemplary process carried out by the image processing module shown in FIG. 1.

With reference to FIG. 3, an exemplary operation of the image processing module 104 is now described when the MFD 100 is directed to perform one or more selected functions, for example, scan-to-file, scan-to-export (i.e., sending a fax), or other function where an input document is being stored or transmitted. In step 200, raster data or a pixel map (e.g., such as the one shown in FIG. 1) is acquired by the document input module 102, for example using its scanner in the usual manner. In step 202, the raster data or pixel map is segmented or otherwise separated and/or divided into a plurality of MRC planes, e.g., as is shown in FIG. 1. Any appropriate separation/segmentation technique and/or algorithm may be employed. For example, U.S. Pat. Nos. 6,400,844; 6,373,981 and 6,324,305, all incorporated by reference herein in their entirety, describe suitable approaches to segmenting data to create MRC planes.

As step 204, one or more of the MRC planes are detected to locate identifiable geometric shapes. Such identifiable shapes include rectangles and other polygons, circles, ovals, ellipsoids, etc. For example, the identifiable shapes detected optionally include the set of shapes that a file container such as PDF supports as vector graphics.

In one suitable embodiment, shape recognition is carried out by comparing a window shape (i.e., a proposed shape found in the MRC plane) to the set of identifiable shapes using hypothesis testing. First, the shape parameters of the window shape are estimated, e.g., width, height, radius, orientation for not symmetrical shapes, etc. Second, the window shape is then matched to a template shape having the estimated parameters. The shape is considered recognized if a match is found. Of course, other known shape recognition techniques are optionally employed, e.g., including parametric distance, Hough transform, rubber masking, etc. Suitably, lines are also included in the identifiable shapes. For example, they may be considered a more specific example of a rectangle that is very thin in one dimension.

At step 206, the identified shapes are tested for color uniformity. Suitably, color uniformity is determined by comparing the pixels within the identified shape to each other. If a sufficient number of pixels are within a sufficient tolerance of one another in color, then the shape is judged to be uniform in color. Of course, alternately other known method for determining color uniformity may be employed.

At step 208, once a shape has been identified and judged to be uniform in color, that shape is replaced in the MRC plane from which it came with a corresponding vector graphic representation, for example, it is represented as a graphic object using the appropriate PDF graphic representation. For example, a rectangular shape is represented by specifying the original of the shape, along with the width, height, and the color of the shape.

At step 210, the various MRC planes are compressed. Each plane is optionally compressed using a compression technique and/or algorithm most suited to its content. For example, foreground and background planes are optionally JPEG compressed while the selector plane is G4 compressed.

At step 212, the MRC data is then stored in the storage device 110, for example, within a file contained such as a PDF file. Alternately, the file may be exported or transmitted, for example, as a fax or electronic mail.

For the PDF imaging model used, when printing, it is preferable that the content object stream order be held against conversion, for example, between PS (PostScript) and PDF format, to ensure correct printing. In principal, the object order stream should be kept the same.

In one experiment conducted, an identical document containing three rectangular boxes, text, and photographic content was process in two different manners. In a first instance, the rectangular boxes were bitmap encoded in accordance with a traditional MRC model. In a second instance, the rectangular boxes were replaced with vector graphic representations as described herein. In the first instance, the file size was approximately 111 kilobytes (k), and in the second instance, the file size was approximately 89 k. In other words, a savings of about 22 k was realized in the file size by utilizing the enhanced MRC processing approach described herein over traditional MRC processing. Additionally, image quality was also enhanced to some degree.

In connection with the particular exemplary embodiments presented herein, certain structural and/or function features are described as being incorporated in particular embodiments. It is to be appreciated that different aspects of the exemplary embodiments may be selectively employed as appropriate to achieve other alternate embodiments suited for desired applications, the other alternate embodiments thereby realizing the respective advantages of the aspects incorporated therein.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the inventive subject matter be construed as including all such modifications and alterations insofar as they come within the scope of the appended claims or the equivalents thereof.

The invention claimed is:

1. A method of compressing a document, said method comprising:
    (a) acquiring an image of the document, said image represented by pixels;
    (b) segmenting the image into Mixed Raster Content (MRC) planes including a foreground plane that receives a first portion of the pixels, a background plane that receives a second portion of the pixels, and a selector plane that identifies which of the foreground and background planes the pixels belong to;
    (c) identifying a geometric shape in at least one of the MRC planes;
    (d) determining if the identified geometric shape has a substantially uniform color; and,
    (e) replacing the identified shape when it is determined to have a substantially uniform color with a vector graphic representation of the geometric shape.

2. The method of claim 1, further comprising:
    (f) compressing at least one of the MRC planes.

3. The method of claim 2, wherein step (f) comprises:
    compressing one of the MRC planes with a lossy compression algorithm; and, compressing another one of the MRC planes with a lossless compression algorithm.

4. The method of claim 1, wherein the selector plane is a bitmap.

5. The method of claim 1, wherein step (c) comprises:
finding a potential geometric shape;
estimating parameters defining the found shape;
matching the found shape to a template shape having the estimated parameters; and,
considering the found shape as identified if there is a match with the template shape.

6. A system for compressing a document, said system comprising:
means for acquiring an image of the document, said image represented by pixels;
means for segmenting the image into Mixed Raster Content (MRC) planes including a foreground plane that receives a first portion of the pixels, a background plane that receives a second portion of the pixels, and a selector plane that identifies which of the foreground and background planes the pixels belong to;
means for identifying a geometric shape in at least one of the MRC planes;
means for determining if the identified geometric shape has a substantially uniform color;
means for replacing the identified shape when it is determined to have a substantially uniform color with a vector graphic representation of the geometric shape; and,
means for compressing at least one of the MRC planes.

7. The system of claim 6, wherein the means for compressing applies a lossy compression algorithm to one of the MRC planes and a lossless compression algorithm to another of the MRC planes.

8. An image processing device comprising:
a document input module that acquires an input pixel map representation of an input document, said input pixel map containing a plurality of pixels; and,
an image processor that:
(i) segments the input pixel map into Mixed Raster Content (MRC) data including a first plane that receives a first portion of the pixels, a second plane that receives a second portion of the pixels, and a selector plane that identifies which of the first and second planes the pixels belong to;
(ii) identifies a geometric shape in at least one of the planes;
(iii) determines if the identified geometric shape has a substantially uniform color;
(iv) replaces the identified shape when it is determined to have a substantially uniform color with a vector graphic representation of the geometric shape;
(v) compresses at least one of the planes; and,
(vi) places the MRC data within a file container.

9. The image processing device of claim 8, wherein the image processing device is a Multi-Function Device (MFD).

10. The image processing device of claim 9, wherein the MFD includes at least one of a facsimile function, a printer function, a copier function and a scanner function.

11. The image processing device of claim 8, wherein the document input module includes a scanner.

12. The image processing device of claim 8, further comprising:
an image output module including a print engine that marks an output document on media supplied from a media supply.

13. The image processing device of claim 12, wherein the print engine is a xerographic print engine.

14. The image processing device of claim 8, further comprising:
exporting means for transmitting the file to a designated party.

15. The image processing device of claim 14, wherein the exporting means transmits the file via at least one of facsimile or electronic mail.

16. The image processing device of claim 8, further comprising:
a storage device that stores the file.

* * * * *